United States Patent
Hatano (10) Patent No.: US 9,664,359 B2
(45) Date of Patent: May 30, 2017

(54) LIGHT EMITTING DEVICE AND METHOD OF MANUFACTURING COVER USED IN THE SAME

(71) Applicant: NICHIA CORPORATION, Anan-shi, Tokushima (JP)

(72) Inventor: Tomohiko Hatano, Tokushima (JP)

(73) Assignee: NICHIA CORPORATION, Anan-Shi (JP)

( * ) Notice: Subject to any disclaimer, the term of this patent is extended or adjusted under 35 U.S.C. 154(b) by 0 days.

(21) Appl. No.: 14/037,988

(22) Filed: Sep. 26, 2013

(65) Prior Publication Data
US 2014/0085885 A1 Mar. 27, 2014

(30) Foreign Application Priority Data

Sep. 27, 2012 (JP) .................................. 2012-213866
Apr. 19, 2013 (JP) .................................. 2013-088409

(51) Int. Cl.
| | |
|---|---|
| *F21V 11/08* | (2006.01) |
| *F21V 31/00* | (2006.01) |
| *B29C 69/02* | (2006.01) |
| *G09F 27/00* | (2006.01) |
| *G09F 9/302* | (2006.01) |
| *G09F 9/33* | (2006.01) |

(52) U.S. Cl.
CPC .............. *F21V 11/08* (2013.01); *B29C 69/02* (2013.01); *F21V 31/00* (2013.01); *G09F 9/3026* (2013.01); *G09F 9/33* (2013.01); *G09F 27/008* (2013.01)

(58) Field of Classification Search
CPC ......... F21V 11/08; F21V 11/14; G09F 27/008

USPC ........................................................ 362/97.3
See application file for complete search history.

(56) References Cited

U.S. PATENT DOCUMENTS

| | | | | |
|---|---|---|---|---|
| 5,647,152 | A * | 7/1997 | Miura | ............................. 40/541 |
| 5,741,058 | A * | 4/1998 | Suzuki et al. | ............. 362/23.16 |
| 6,789,921 | B1* | 9/2004 | Deloy et al. | ................. 362/97.3 |
| 8,350,788 | B1* | 1/2013 | Nearman | .............. G09F 9/3026 |
| | | | | 315/169.3 |

(Continued)

FOREIGN PATENT DOCUMENTS

| | | |
|---|---|---|
| JP | 8-185130 A | 7/1996 |
| JP | 8-234684 A | 9/1996 |

(Continued)

*Primary Examiner* — Jong-Suk (James) Lee
*Assistant Examiner* — Christopher E Dunay
(74) *Attorney, Agent, or Firm* — Foley & Lardner LLP (57) ABSTRACT

An object of the present invention is to preventing the propagation of light to improve the display quality of the light emitting device. A light emitting device according to an embodiment has a case, a base member disposed at a front side of the case, a plurality of light emitting elements mounted at the front side of the base member, and a cover covering the light emitting elements. The cover has a light transmissive member integrally covering the plurality of light emitting elements, and a light-blocking member disposed at a front side of the light transmissive member and having openings anterior to the light emitting elements respectively. Further, the light transmissive member has, on its back surface, a back-side rough surface portion in a region different from the region facing the front surfaces of the light emitting elements.

21 Claims, 7 Drawing Sheets

(56) References Cited

U.S. PATENT DOCUMENTS

| | | | |
|---|---|---|---|
| 2002/0141065 A1* | 10/2002 | Cowan | G02B 5/021 359/599 |
| 2005/0231949 A1* | 10/2005 | Kim et al. | 362/249 |
| 2007/0165162 A1* | 7/2007 | Meersman | G09F 9/30 349/114 |
| 2008/0055931 A1* | 3/2008 | Verstraete et al. | 362/612 |
| 2008/0078733 A1* | 4/2008 | Nearman et al. | 211/189 |
| 2010/0027294 A1* | 2/2010 | Lee et al. | 362/620 |
| 2011/0073894 A1* | 3/2011 | Chu | H01L 33/22 257/98 |
| 2011/0267699 A1* | 11/2011 | Wu | 359/614 |
| 2011/0299269 A1 | 12/2011 | Hata et al. | |
| 2014/0268738 A1* | 9/2014 | Chan | 362/235 |

FOREIGN PATENT DOCUMENTS

| | | |
|---|---|---|
| JP | 2001-255835 A | 9/2001 |
| JP | 2001-356712 A | 12/2001 |
| JP | 2006-243418 A | 9/2006 |
| JP | 2006-303039 A | 11/2006 |
| JP | 2011-254008 A | 12/2011 |

* cited by examiner

FIG. 5 with back-side rough surface portion | without back-side rough surface portion

——— : rough surface portion

LIGHT EMITTING DEVICE AND METHOD OF MANUFACTURING COVER USED IN THE SAME

BACKGROUND OF THE INVENTION

1. Field of the Invention

The present disclosure relates to a light emitting device having a plurality of light emitting elements mounted on a substrate, and to a method of manufacturing a cover used in the light emitting device.

2. Description of the Related Art

In recent years, there have been proposed light emitting devices in which a plurality of light emitting elements are covered with a cover. For example, JP H08-185130A and JP H08-234684A disclose light emitting devices which have a cover including a "convex lens assembly plate 3" and a "light shielding louver 4".

RELATED ART DOCUMENTS

Patent Literature

See Patent Literature 1: JP H08-185130A.
See Patent Literature 2: JP H08-234684A.

However, in the light emitting devices disclosed in JP H08-185130A and JP H08-234684A the display quality may be reduced, when, for example, only the predetermined light emitting elements are turned on and adjacent other light emitting elements are not turned on. This is because when the light from the predetermined light emitting elements propagates in the "convex lens assembly plate 3", adjacent other light emitting elements look to emit little light despite not emitting light.

SUMMARY OF THE INVENTION

The present invention is devised to solve the problems described above, and an object of the present invention is to improve the display quality by preventing the propagation of light.

A light emitting device according to an embodiment has a case, a base member disposed at a front side of the case, a plurality of light emitting elements mounted at a front side of the base member, and a cover covering the light emitting elements. The cover has a light transmissive member integrally covering the plurality of light emitting elements, and a light-blocking member disposed at a front side of the light transmissive member and having openings located anterior to the light emitting elements. Further, the light transmissive member has, on its back side, a back-side rough surface portion in a region different from the region facing the front-surfaces of the light emitting elements.

DETAILED DESCRIPTION OF EMBODIMENTS

Embodiments of the present invention will be described below with reference to the drawings. The embodiments shown below are intended as illustrative to give a concrete form to technical ideas of the present invention, and the scope of the invention is not limited to those described below.

Figure 1:
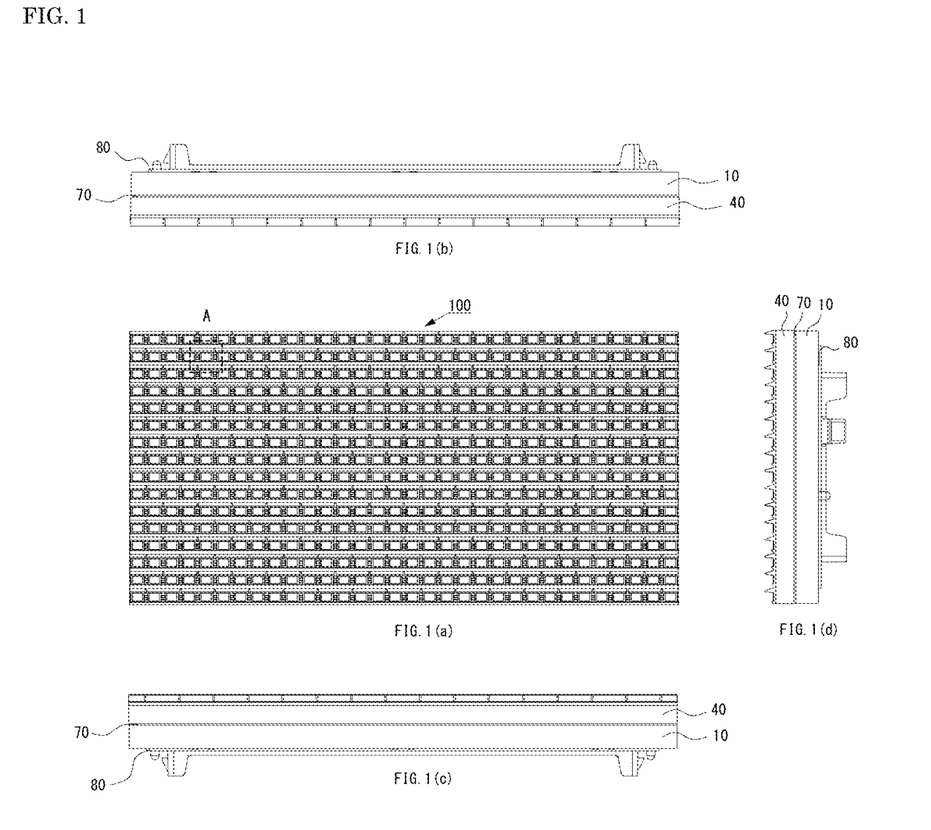
FIGS. 1(a) to 1(d) are diagrams illustrating a light emitting device according to an embodiment.
Figure 2:
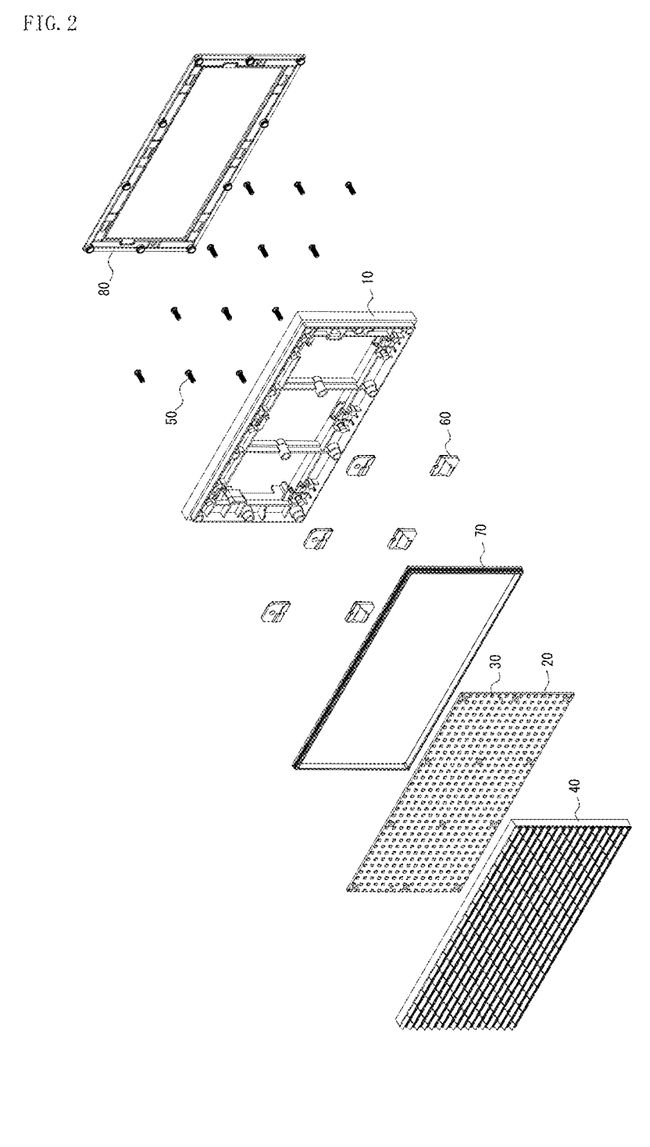
FIG. 2 is an exploded perspective view of a light emitting device according to an embodiment.
Figures 3, 3A, 3B, 3C, 3D:
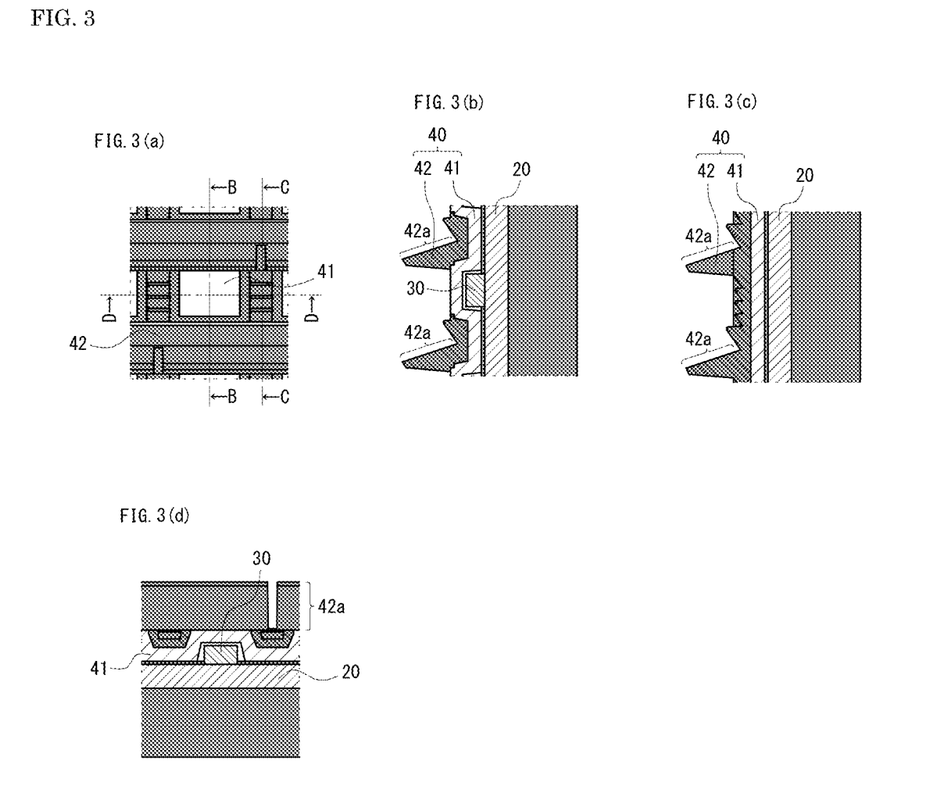
FIGS. 3(a) to 3(d) are diagrams illustrating a cover etc., used in a light emitting device according to an embodiment.
Figures 4, 4A, 4B:
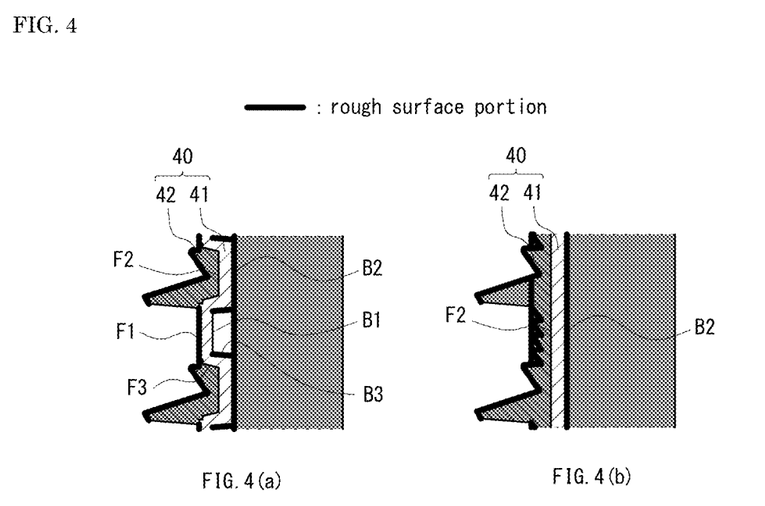
FIGS. 4(a) and 4(b) are diagrams illustrating a cover used in a light emitting device according to an embodiment.

A light emitting device 100 according to the present embodiment is shown in FIGS. 1(a) to 1(d). FIG. 1(a) is a front view (observer's side) of the light emitting device 100, FIG. 1(b) is a top view of the light emitting device 100, FIG. 1(c) is a bottom view of the light emitting device 100, and FIG. (d) is a side view of the light emitting device 100. FIG. 2 is a diagram for illustrating the structure of the light emitting device 100. As shown in FIG. 2, the light emitting device 100 has a case 10, a base member 20, light emitting elements 30, a cover 40, etc. FIGS. 3(a) to 3(d) are diagrams for illustrating the relationship between the base member 20, a light emitting element 30, and the cover 40 in detail. FIG. 3(a) is an enlarged view of region A in FIG. 1(a), FIG. 3(b) is a cross-sectional view taken along B-B of FIG. 3(a), FIG. 3(c) is a cross-sectional view taken along C-C of FIG. 3(a), and FIG. 3(d) is a cross-sectional view taken along D-D of FIG. 3(a), respectively. As shown in FIGS. 3(a) to 3(d), the cover 40 has a light transmissive member 41 and a light blocking member 42. FIGS. 4(a) and 4(b) are for illustrating the forming locations of the front-side rough surface portion and the back-side rough surface portion, FIG. 4(a) corresponds to FIG. 3(b) and FIG. 4(b) corresponds to FIG. 3(c) respectively. In FIGS. 4(a) and 4(b), only the cover 40 is shown for descriptive purposes, in which the thick lines in FIGS. 4(a) and 4(b) indicate the forming locations of the rough surface portion, and the front side is to be a front-side rough surface region and the back side is to be a back-side rough surface region. In FIGS. 3(a) to 3(d), FIGS. 4(a) and 4(b), in order to clarify the positional relationship between the light transmissive member 41 and the light-blocking member 42, the light-blocking member 42 only is shown with light-shaded.

As shown in the figures, the light emitting device 100 has the case 10, the base member 20 disposed at the front side of the case 10, a plurality of light emitting elements 30 mounted on the front side of the base member 20, and the cover 40 covering the light emitting elements 30. The cover 40 has a light transmissive member 41 integrally covering the plurality of light emitting elements 30, and a light-blocking member 42 disposed at the front side of the light transmissive member 41 and having openings respectively located anterior to the light emitting elements 30. Further, the light transmissive member 41 has a back-side rough surface portion on its back-surface. With this arrangement, a light emitting device with excellent display quality can be obtained. Advantages will be described below.

A large portion of light emitted from a single light emitting element 30 is extracted to outside from the opening of the light-blocking member 42 via the light transmissive member 41. However, a portion of light may propagate in the light transmissive member 41 and reach an adjacent opening. In this case, even when the other light emitting elements are not turned on, the other light emitting elements seem to emit little light (hereinafter this phenomenon may also be referred simply to "propagation of light") which blurs the border of the lighted area, resulting in reduction of the display quality. For this reason, the light emitting device 100 has a back-side rough surface portion on the back-surface of the light transmissive member 41. With this arrangement, light propagating in the light transmissive member 41 can be diffusely reflected or extracted to outside at the back-side rough surface portion and which impede the light from reaching the adjacent openings, and thus the display quality is thought to be improved.

Figure 5:
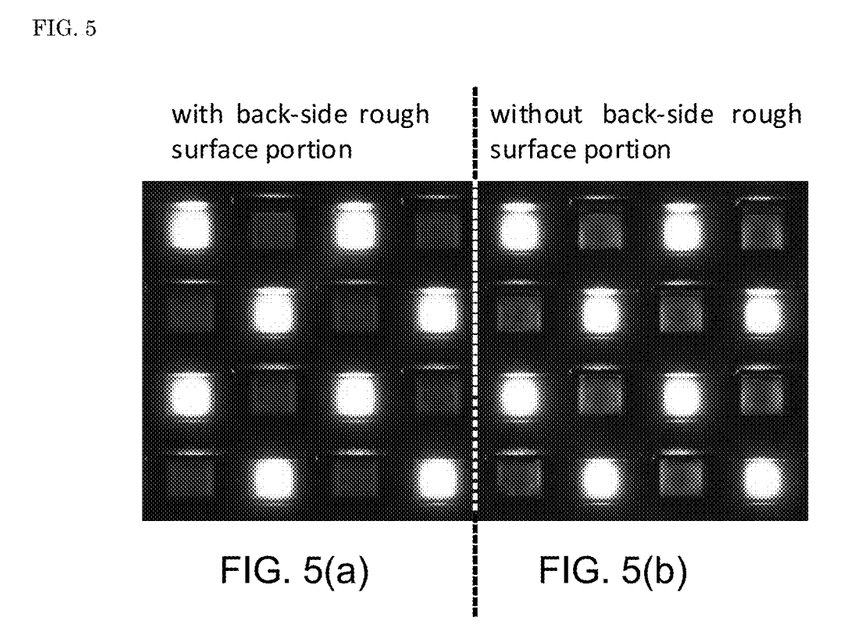
FIGS. 5(a) and 5(b) are photographic views illustrating an effect of a light emitting device according to an embodiment.

The effect of the light emitting device 100 will be described referring to the images shown in FIGS. 5(a) and 5(b). In FIGS. 5(a) and 5(b), a part with the back-side rough surface portion (FIG. 5(a)) and a part without the back-side rough surface portion (FIG. 5(b)) are formed side by side in a single cover 40 so as to confirm whether any difference can be observed in the display quality by comparing both. The image shown in FIG. 5(a) includes a matrix of the light emitting elements 30; four in longitudinal direction and eight in lateral direction, where in each row (lateral direction) and each column (longitudinal direction), the light emitting elements which to be turned on and turned off are alternately arranged. From the image shown in FIGS. 5(a) and 5(b), little propagation of light is observed (almost no light is leaking from the openings of turned-off portions, so that they don't seem to emit little light) in the left half portion (FIG. 5(a)) which has the back-side rough surface portion, and thus it can be understood to have excellent display quality. On the other hand, in the right half portion of the image (FIG. 5(b)) which does not have the back-side rough surface portion, propagation of light occurred (light is leaking from the openings of turned-off portions, so that they seem to emit little light), and thus it can be understood to have inferior display quality.

The main components of the light emitting device 100 will be described below.

(Case 10)

The case 10 is to arrange the base member 20 anterior to itself (i.e. its front-surface side) and for example, made of a resin (polycarbonate etc). As shown in FIG. 2, the back side of the case 10 has a large opening so that, for example, even after the base member 20 is attached to the case 10, a cable can be connected from the back side to a connector disposed on the back-surface of the base member 20. The case 10 has screw holes at twelve locations each allows insertion of the screw 70 so that the cover 40 can be fixed from the back side.

As shown in FIG. 2, six brackets 60 are arranged between the case 10 and the base member 20. The brackets 60 are for installing the light emitting device 100 outside, and are designed so that inserting the screws from the back side to fix the light emitting device 100 itself on an outer wall or the like through the brackets 60. The base member 20 is fixed by being held between the case 10 and the cover 40. The brackets 60 are fixed by being engaged with the case 10.

(Base Member 20)

The base member 20 is a so-called circuit substrate for mounting the light emitting elements 30. In the light emitting device 100, a total of 512 (16 in column and 32 in row) units of the light emitting elements 30 are arranged on the front side of the base member 20, and various electrical components for driving the light emitting elements 30 are arranged on the back side of the base member 20.

(Light Emitting Element 30)

For the light emitting elements 30, surface-mount type light emitting diodes (LEDs) are typically used. In the light emitting device 100, surface-mount type LEDs (each having RGB LED chips) capable of full color presentation are used as the light emitting elements 30, in which each of the light emitting elements 30 constitutes a single pixel. Each light emitting element 30 has a quadrangular shape when seen from the front, and has a front-surface for emitting light, four side surfaces, and a bottom surface facing the base member 20, thus constitutes substantially a hexahedral shape.

The distance between the light emitting elements 30 (distance between the centers of two adjacent light emitting elements) can be preferably 1 mm or greater and less than 8 mm, more preferably 2 mm or greater and less than 6 mm, and further preferably 2 mm or greater and less than 5 mm. This is because if the distance between the light emitting elements is too small, formation of the light-blocking member 42 between the light emitting elements becomes difficult, on the other hand, if the distance between the light emitting elements is too large, the propagation of light may be impeded, which obscures the effect of the present invention. In the light emitting device 100, the distance between the light emitting elements is set to 3 mm.

(Cover 40)

As shown in FIG. 2 and FIGS. 3(b) and 3(c), the cover 40 is disposed at the front side of the base member 20. The cover 40 has a light transmissive member 41 integrally covering the plurality of light emitting elements 30, and a light-blocking member 42 disposed at the front side of the light transmissive member 41 and having openings respectively located anterior to the light emitting elements 30. A large portion of light emitted from a single light emitting element 30 is emitted frontward via the light transmissive member 41. The light-blocking member is typically colored in a dark color such as a black color so as to improve the contrast when viewed from the front side (observer's side). The cover 40 covers the substrate 20 as a whole, so that ingress of rainwater or the like from the front side can also be prevented. Thus, the cover 40 provides a waterproof structure.

The back-surface of the light transmissive member 41 can be flat but a shape having a plurality of recesses for respectively housing each of the light emitting elements 30 is preferably employed. In this case, as shown in FIGS. 4(a) and 4(b), the back-surface of the light transmissive member 41 can be divided into a first back-surface region B1 which is the bottom surface of the recess and is located anterior to the light emitting elements 30 (i.e., facing the front-surface of the light emitting elements 30), a second back-surface region B2 connecting a plurality of recesses, and a third back-surface region B3 connecting the first back-surface region B1 and the second back-surface region B2. With this arrangement, compared to the case where the back-surface of the light transmissive member 41 is flat, the planar dimension of the back-surface can be increased with the amount which corresponds to the third back-surface region B3 to be the side surfaces of the recess. Moreover, the back-side rough surface portion can be provided on both the second back-surface region B2 and the third back-surface region B3, and thus a large formation area can be allowed for the back-side rough surface portion, so that the propagation of light can be further reduced.

Figure 7:
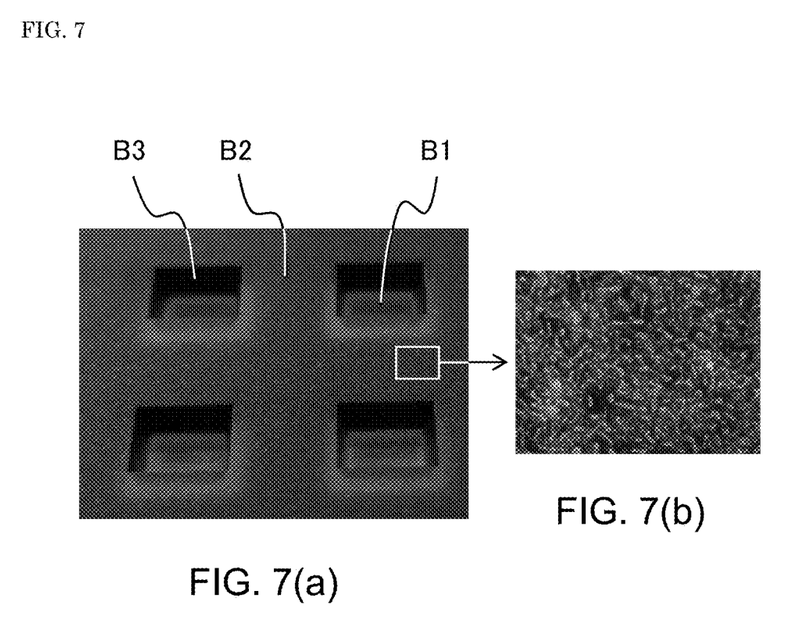
FIG. 7(a) is a photographic view of a cover used in a light emitting device according to an embodiment, seen from a back side.
FIG. 7(b) is a partially enlarged view of an area enclosed by a rectangle in FIG. 7(a).

FIGS. 7(a) and 7(b) are images of the cover 40 taken from the back side. In FIG. 7(a), the image includes four first back-surface regions B1 each defining a bottom surface of a recess, second back-surface regions B2 each connecting the recesses, and third back-surface regions B3 each connecting the first back-surface regions B1 and the second back-surface regions B2 respectively. In this embodiment, a back-side rough surface portion is formed on each of the second back-surface region B2 and the third back-surface region B3, and for ease of comprehension of the state of those, a partially enlarged image of the second back-surface region B2 is shown as FIG. 7(b) which is shown at the right side of FIG. 7(a). In FIG. 7(a), each portion with white color shows a portion protruding in a front direction of the diagram, and each portion with black color shows a portion recessed in a back direction of the diagram. As shown in the images, a plurality of minute protrusions are formed on the back-surface of the light transmissive member 41, to obtain a rough surface.

Further, the light transmissive member 41 can be provided with a plurality of protruded portions each formed corresponding to each of the recesses on the back-surface. In this case, as shown in FIGS. 4(a) and 4(b), each of the protruded portions can be designated as a first front-surface region F1 which is the top surface of each of the protruded portions and located anterior to the corresponding light emitting element 30, a second front-surface region F2 connecting the plurality of protruded portions, and a third front-surface region F3 connecting the first front-surface region F1 and the second front-surface region F2. Moreover, the second front-surface side region F2 is preferably located closer to the back-surface side than the first back-surface region B1. With this arrangement, the length of the propagation path of light can be increased, so that the propagation of light can be further prevented. As seen in FIGS. 4(a) and 4(b), the first front-surface region F1 with the first back-surface region B1, the second front-surface region F2 with the second back-surface region B2, and the third front-surface region F3 with the third back-surface region B3, are respectively arranged corresponding to each other.

As shown in FIG. 4(a), the light transmissive member 41 preferably does not have a back-side rough surface portion in the first back-surface side region B1 (that is, the first back-surface region B1 preferably has a flat surface). The first back-surface region B1 is a region facing the front-surface of the corresponding light emitting element and light from the light emitting element is directly incident. For this reason, if the rough surface portion is formed on the first back-surface region B1, the light can be subjected to diffuse reflection or the like, which may result in a reduction in the brightness.

The light blocking member 42 has a flange 42a at a portion to be above each of the light emitting elements 30 arranged in a row direction (in the lateral direction in FIG. 1(a)). (see FIGS. 3(b) to 3(d) etc.) Each flange 42a is widely protruded in front direction so that occurrence of glare due to external light (such as sunlight) incident on the observer's surface can be reduced.

In the light emitting device 100, in order to further reduce the occurrence of glare, a rough surface portion (front-side rough surface portion) is provided at the front-surface of the cover 40. The formation locations of the front-side rough surface portions are as shown in FIGS. 4(a) and 4(b), among the portions indicated with thick lines in each figure, the portions locating at the front-surface side are the front-side rough surface portions. More specifically, at the front side of the cover 40, the front-side rough surface portions are formed at the regions other than the lower surfaces of the flanges 42a. In view of prevention of glare, the rough surface portion is preferably formed in the all region of the front-surface of the cover 40, but forming the lower surface of the flanges 42a with the rough surface may result in difficulty in forming of the cover 40 itself. The reason is that providing a rough surface portion on the mold to be used in forming the cover 40 so as to transfer the rough surface portion on the lower surface of the flanges 42a, the minute irregularities constituting the rough surface portion act as resistance due to the lower surface of the flanges 42a being approximately perpendicular to the surface of the cover 40, and which impedes efficient removal of the mold.

Further, a rough surface portion (back-side rough surface portion) is disposed on the back side of the cover 40. The front-side rough surface portion is provided to prevent glare, whereas the back-side rough surface portion is provided to impede the propagation of light, and thus the aims differ greatly. The formation locations of the back-side rough surface portions are as shown in FIGS. 4(a) and 4(b), and among the portions indicated with thick lines in each figure, the portions locating at the back-surface side are the back-surface side rough surface portions. More specifically, on the back-surface of the cover 40, the back-side rough surface portions are disposed on the all the regions except for the regions facing the front-surfaces of the light emitting elements 30. It is understood that with the back-side rough surface portion, the light is diffusely reflected within the light transmissive member 41 or is extracted to outside, so that the amount of propagating light can be reduced.

The rough surface portions (including the front-side rough surface portions and the back-side rough surface portions) have minute protruded portions, preferably with an average height of 2 μm or greater and less than 50 μm, more preferably 3 μm or greater and less than 40 μm, and further preferably 5 μm or greater and less than 30 μm. The reason is that in the case where the protruded portions are too high or too low, the contrast may be reduced at the front side and the effect of preventing the propagation of light may be difficult to obtain at the back side. In the present embodiment, the formation regions of the rough surface portions are as shown in FIG. 4(a) and FIG. 4(b). That is, in the light transmissive member 41, minute protrusions are formed in the first front-surface region F1, the second back-surface region B2, and the third back-surface region B3, to obtain the rough surface portions. The height of the protrusions was about 10 μm. In the light-blocking member 42, the minute protrusions are formed on a large part of the surfaces (except for the lower surface of the flanges) to obtain the rough surface portion. The height of the protrusions was about 20 μm.

In the present embodiment, the cover 40 having the light transmissive member 41 and the light blocking member 42 was formed by way of double-molding (two-color molding). With this arrangement, the light transmissive member 41 and the light-blocking member 42 can be formed integrally, so that the ease of handling of the cover 40 can be improved. For the light transmissive member 41 and the light-blocking member 42, polycarbonate resins were used respectively.

Figure 6:
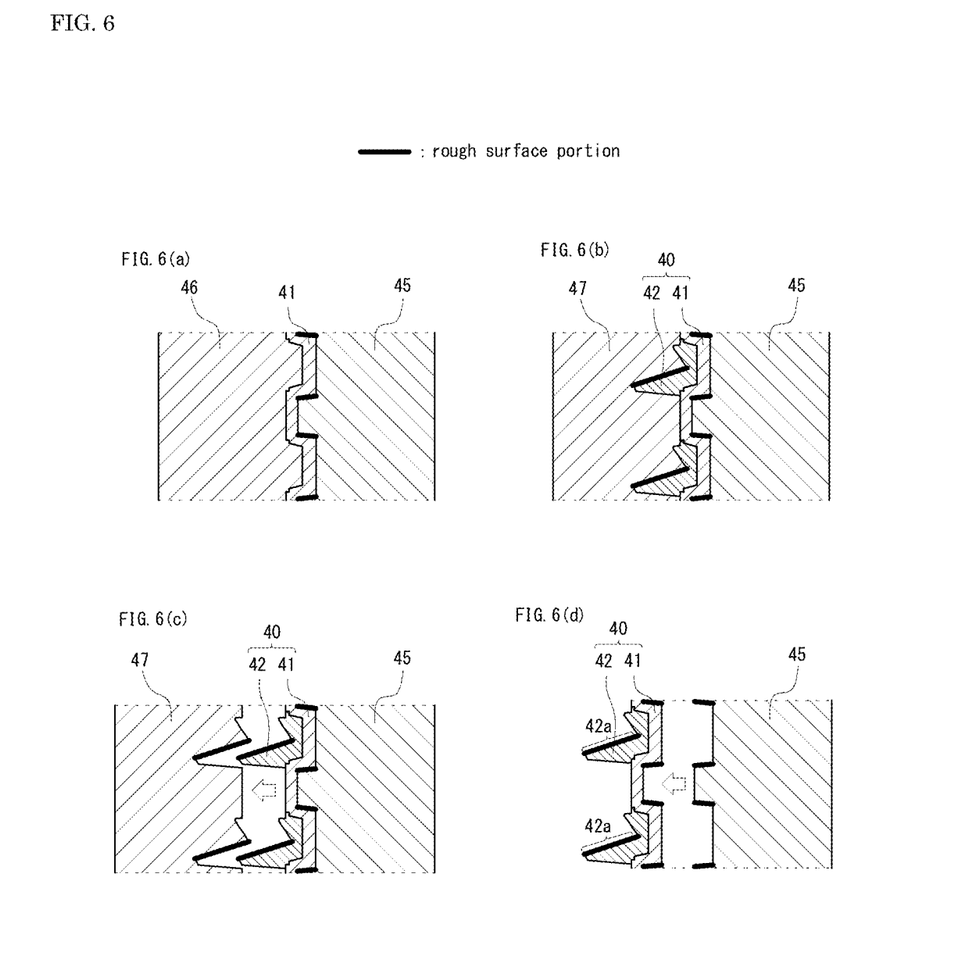
FIGS. 6(a) to 6(d) are diagrams illustrating a method of manufacturing a cover used in the light emitting device.

Now, double molding of the cover 40 will be described below with reference to FIGS. 6(a) to 6(d). Shown below is a method of manufacturing a cover 40 to be used in a light emitting device. The cover includes a light transmissive member 41 for integrally covering a plurality of light emitting elements, and a light-blocking member 42 disposed anterior to the light transmissive member 41 and having an opening at front side of each of the light emitting elements. The method includes, in order of recitation, using a back-surface side mold 45 having a plurality of protruded portions and a rough-surface portion formed on side surfaces of each of the protruded portions and a first front-surface side mold 46, forming a light transmissive member 41 having a plurality of recesses to house the light emitting elements respectively and a back-side rough surface portion at a side surface defining the recess (see FIG. 6(a)), forming a light-blocking member 42 having flanges 42a formed with the front-side rough surface portions, after detaching the first front-side mold 46 from the light transmissive member 41, using a second front-surface side mold 47 having a recess and a rough surface portion formed on an inner side of the recess (see FIG. 6(b)), after detaching the second front-surface side mold 47 from the light-blocking member 42 (see FIG. 6(c)), and removing a cover 40 having the light transmissive member 41 and the light-blocking member 42 by detaching the back-surface side mold 45 from the light transmissive member 41 (see FIG. 6(d)). In FIG. 6, for reference, the thick lines indicate the portions where the rough surface portions are formed.

With this arrangement, the cover 40, in which warping is prevented, can be stably manufactured by using injection molding. Advantages will be described below.

As described above, in order to prevent glare, the flanges 42a are provided with the front-side rough surface portion on the upper surfaces respectively. Each flange 42a is widely protruded in front direction and the upper surface of each flange 42a has an angle approximately perpendicular with respect to the surface of the cover 40 (the longitudinal direction in FIG. 6(c)), so that at the time of detaching the second front-surface side mold, the rough-surface portion on the upper surfaces may present a relatively large resistance. As a result, the flanges 42a may be pulled by the second front-surface side mold 47 which in some cases result in generation of warping in the cover 40. Further, at the time of removing the cover from the mold in a finishing step, the cover 40 is needed to be pushed by ejection pins equipped to the mold. In this case, the traces of the ejector pins are left on the cover 40, and therefore, the mold which is last to be detached from the cover 40 is preferably a back-surface side mold 45. With this arrangement, the traces of the ejector pins are not left on the front-surface of the cover 40 which is to be the observer's side (in this embodiment, parts of the second back-surface regions B2 are arranged to be pushed by the ejector pins respectively). However, as a result of the flanges 42a being pulled by the second front-surface side mold 47, the cover 40 may be attached to the second front-surface side mold 47 and detached from the back-surface side mold 45, despite the intention to detach the second front-surface side mold 47 from the cover 40 prior to the back-surface side mold 45 (see FIG. 6(c)).

For this reason, with the use of a back-surface side mold 45 having a plurality of protrusions each having side surfaces formed with rough surface portions so as to also increase the detaching resistance on the back-surface side. Thus, the detaching resistance at the front-surface side and at the back-surface side at the time of detaching the mold can be balanced. That is, the rough surface portions are formed on the side surfaces of the protruded portions which are approximately perpendicular to the surface of the light transmissive member 41 to increase the detaching resistance, which is the resistance at the time of detaching the mold, of the back-surface side mold 45, which can balance with the detaching resistance of the second front-surface side mold 47. With this arrangement, not only the propagation of light can be impeded as a result of transferring the rough surface portions of the back-surface side mold 45 onto the side surfaces of the recess of the light transmissive member 41, but also fabrication of the cover 40 becomes possible in which generation of warpage can be prevented.

In the cover 40, the regions provided with the front-side rough surface portion and the back-side rough surface portion are shown as in FIGS. 4(a) and 4(b). In FIGS. 6(a) and 6(b), for ease of visible comprehension of the portions which are particularly effective in adjusting the detaching resistance of the mold, the upper surface of the flanges 42a and the side surfaces of the recess of the light transmissive member 41 only are shown in thick lines as the rough surface portions.

(First Packing 70, Second Packing 80)

As shown in FIG. 2 etc., a first packing 70 can be interposed between the case 10 and the cover 40. With this arrangement, ingress of rainwater or the like from (a space) between the case 10 and the cover 40 can be prevented. Further, in the light emitting device 100, a second packing 80 is provided at the back-surface side of the case 10. With this arrangement, in the case where the light emitting device 100 is installed on an outer wall or the like, ingress of the rainwater or the like from (a space) between the light emitting device 100 and the outer wall can be prevented. Accordingly, a light emitting device with waterproof performance as a whole can be obtained.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims. This application is based on applications No. 2012-213866 filed in Japan on Sep. 27, 2012, and No. 2013-088409 filed in Japan on Apr. 19, 2013, the contents of which are incorporated hereinto by references.

What is claimed is:

1. A light emitting device comprising:
a case;
a base member disposed at a front side of the case;
a plurality of light emitting elements mounted at a front side of the base member; and
a cover covering the light emitting elements, the cover comprising:
a light transmissive member covering a front side of the plurality of light emitting elements, and
a light-blocking member disposed at a front side of the light transmissive member,
wherein the light-blocking member has openings in portions anterior to the light emitting elements,
wherein the light transmissive member has, on a back surface thereof, a plurality of recesses respectively housing respective ones of the light emitting elements,
wherein the back surface of the light transmissive member has first back surface regions located anterior of the respective light emitting elements, second back surface regions extending between the respective recesses, and third back surface regions extending between the respective first and second back surface regions,
wherein the back surface of the light transmissive member is roughened in at least the second back surface regions, and
wherein the back surface of the light transmissive member is not roughened in the first back surface regions.

2. The light emitting device according to claim 1, wherein the back surface of the light transmissive member is also roughened in the third back surface regions.

3. The light emitting device according to claim 2,
wherein the light transmissive member has, at a front surface thereof, a plurality of protruding portions corresponding to each of the recesses,
wherein the front surface of the light transmissive member has first front surface regions located at the protruding portions anterior of the respective light emitting elements, a second front surface region extending between the respective protruding portions, and a third front surface region extending between the respective first and second front surface regions, and wherein the second front surface region is disposed on a back surface side of light transmissive member relative to the first back surface region.

4. The light emitting device according to claim 1, wherein the light-blocking member has a plurality of flanges each having a front surface having a portion that is roughened.

5. The light emitting device according to claim 4,
wherein the front surface of each of the plurality of flanges has an upper surface portion and a lower surface portion, and
wherein the lower surface portion is not roughened.

6. The light emitting device according to claim 1, wherein the cover is waterproof.

7. The light emitting device according to claim 1, wherein the light emitting elements are surface-mount LEDs.

8. The light emitting device according to claim 7, wherein a distance between centers of two adjacent ones of the light emitting elements is 1 mm or greater and less than 8 mm.

9. The light emitting device according to claim 1, wherein the cover is formed by double-molding.

10. The light emitting device according to claim 1, wherein the light transmissive member has, at a front surface thereof, a plurality of protruding portions corresponding to each of the recesses.

11. The light emitting device according to claim 10,
wherein the front surface of the light transmissive member has first front surface regions located at the protruding portions anterior of the respective light emitting elements, a second front surface region extending between the respective protruding portions, and a third front surface region extending between the respective first and second front surface regions, and
wherein the front surface of the light transmissive member is roughened in at least the first front surface region.

12. The light emitting device according to claim 1, wherein the roughened regions of the back surface of the light transmissive member comprise protruded portions having a height of 2 μm or greater and less than 50 μm.

13. A light emitting device comprising:
a case;
a base member disposed at a front side of the case;
a plurality of light emitting elements mounted at a front side of the base member;
and a cover covering the light emitting elements, the cover comprising:
a light transmissive member covering a front side of the plurality of light emitting elements, and
a light-blocking member disposed at a front side of the light transmissive member, wherein the light-blocking member has openings in portions anterior to the light emitting elements,
wherein the light transmissive member has, on a back surface thereof, a plurality of recesses respectively housing respective ones of the light emitting elements,
wherein the back surface of the light transmissive member has first back surface regions located anterior of the respective light emitting elements, second back surface regions extending between the respective recesses, and third back surface regions extending between the respective first and second back surface regions,
wherein the back surface of the light transmissive member is roughened in at least the second back surface regions,
wherein the back surface of the light transmissive member is not roughened in the first back surface regions, and
wherein at least one region of a front surface of the light transmissive member is roughened.

14. The light emitting device according to claim 13, wherein the light transmissive member has, at a front surface thereof, a plurality of protruding portions corresponding to each of the recesses.

15. The light emitting device according to claim 14,
wherein the front surface of the light transmissive member has first front surface regions located at the protruding portions anterior of the respective light emitting elements, a second front surface region extending between the respective protruding portions, and a third front surface region extending between the respective first and second front surface regions, and
wherein the front surface of the light transmissive member is roughened in at least the first front surface region.

16. The light emitting device according to claim 13, wherein the back surface of the light transmissive member is also roughened in the third back surface regions.

17. The light emitting device according to claim 13, wherein the cover is formed by double-molding.

18. The light emitting device according to claim 13, wherein the light emitting elements are surface-mount LEDs.

19. The light emitting device according to claim 13, wherein a distance between centers of two adjacent ones of the light emitting elements is 1 mm or greater and less than 8 mm.

20. The light emitting device according to claim 13, wherein the light-blocking member has a plurality of flanges each having a front surface having a portion that is roughened.

21. The light emitting device according to claim 20,
wherein the front surface of each of the plurality of flanges has an upper surface portion and a lower surface portion, and
wherein the lower surface portion is not roughened.

* * * * *